(12) United States Patent
Gallagher (10) Patent No.: US 7,142,929 B2
(45) Date of Patent: Nov. 28, 2006

(54) PROCESS DATA MANAGEMENT

(75) Inventor: Finbar Gallagher, County Clare (IE)

(73) Assignee: Frayson Systems Limited, County Clare (IE)

( * ) Notice: Subject to any disclaimer, the term of this patent is extended or adjusted under 35 U.S.C. 154(b) by 0 days.

(21) Appl. No.: 11/148,349

(22) Filed: Jun. 9, 2005

(65) Prior Publication Data

US 2005/0228506 A1   Oct. 13, 2005

Related U.S. Application Data

(63) Continuation of application No. PCT/IE03/000167, filed on Dec. 11, 2003.

(30) Foreign Application Priority Data

Dec. 11, 2002   (IE)   ................... 2002/0961

(51) Int. Cl.
   *G05B 11/01*   (2006.01)
   *G06F 7/00*    (2006.01)
   *G06F 15/16*   (2006.01)
(52) U.S. Cl. .................. 700/19; 707/100; 709/202
(58) Field of Classification Search ................ 700/19, 700/20; 709/203, 213, 216, 219, 229, 205; 707/100, 101
   See application file for complete search history.

(56) References Cited

U.S. PATENT DOCUMENTS 4,539,636 A * 9/1985 Saaksjarvi ................ 711/211
4,719,562 A * 1/1988 Bailly et al. ............... 709/215
5,142,469 A * 8/1992 Weisenborn ................ 700/17
5,185,708 A * 2/1993 Hall et al. .................. 700/7
5,461,721 A * 10/1995 Cormier et al. ............ 711/2
5,600,806 A * 2/1997 Brown et al. .............. 712/204
5,642,515 A * 6/1997 Jones et al. ................ 710/220
5,815,659 A * 9/1998 Umetsu et al. ............. 709/203
6,415,373 B1 * 7/2002 Peters et al. ............... 711/167
6,714,946 B1 * 3/2004 Kanai et al. ............... 707/104.1
6,799,195 B1 * 9/2004 Thibault et al. ............ 709/203

FOREIGN PATENT DOCUMENTS

| DE | 10049021 A1 | 4/2002 |
| EP | 1227379 A1  | 7/2002 |
| WO | WO01/67191  | 9/2001 |

* cited by examiner

Primary Examiner—Thomas Pham
(74) Attorney, Agent, or Firm—Jacobson Holman PLLC (57) ABSTRACT

A process data management system (1) has a number of modules (2–6) each of which can operate independently to capture, process, and record process data from machines (P1–P6). The modules also communicate with each other via a messaging service (21, 40) so that data can be routed between components (22–24, 42, 43, 45) of different modules using the Push mechanism. A Graphical data object (GDO) server (25, 45, 46) downloads applet instances to user browsers in response to the browser addressing a URL. The applet generates an output display in chart form of real time processed data.

19 Claims, 8 Drawing Sheets

PROCESS DATA MANAGEMENT

This is a continuation of PCT/IE2003/000167 filed 11 Dec. 2003 and published in English.

FIELD OF THE INVENTION

The invention relates to collection and processing of process data. In this specification, process data means data from technical processes, such as manufacturing processes and scientific and engineering experimental processes.

PRIOR ART DISCUSSION

There are a wide variety of data collection and analysis systems available at present, and they fall into the following broad categories.

(a) Supervisory, Control, and Data Acquisition (SCADA) Systems

These systems are primarily designed for machine management and supervision in process industries. Typically, bespoke implementations are developed for each site based on a common tool-kit. Although each system is customised to a particular need, and therefore can be matched closely to the customer's requirements, they are time-consuming to develop initially and to adapt as the environment changes. This puts this class of system out of the reach of many potential users and makes them unsuitable for the solution of many problems, since the problem must be solved in a much shorter timescale than it takes to adapt the SCADA system to address it.

The data that these systems generate tends to be very detailed and specific to the particular machine or source that created it. Similar data from different sources may be difficult to correlate because it is named and structured in different ways. This variety also makes it difficult to understand and interpret the data, since each of these structures needs to be learned before the customer can use the data.

(b) Equipment Management Systems

These systems are provided by suppliers of large capital equipment. Their primary purpose is the management of that vendor's equipment. These systems are typically monolithic off-the-shelf packages and so are relatively quick to deploy, but are inflexible in the functions they provide. Their communication and data representation is proprietary and this makes it difficult to integrate them with other systems or to use them in ways not originally foreseen or deemed important by the supplier. As monolithic systems, they must be deployed in the manner envisaged by the supplier, and may in themselves be single points of failure and bottlenecks for the control of the manufacturing process.

(c) Data Logging Systems

Data logging systems are designed to collect or log data from instrumentation. These systems are typically small-scale, off-the-shelf 'point-solutions'. Deployment is usually quick, but little large scale integration or management is possible, and integration with other systems is usually only possible through mechanisms designed for office automation applications. These mechanisms were not originally designed for industrial use and so are often not sufficiently reliable for this application. Their reliability is further compromised by the 'home grown' code required to make them work.

(d) Manufacturing Execution Systems (MES)

MES systems are used to control when, where and by whom a product is made and to retain a history of this activity for future reference. For this reason they are often used by manufacturers of medical products. They tend to be developed on a bespoke basis and to be very large scale: usually a single MES system is installed across a whole factory.

It is therefore an object of the invention to provide a process data management system having some or all of the following advantages:
  simple and quick to deploy and modify to meet changing process environments,
  generating data which is of more immediate benefit to the user for process management, and
  is widely applicable to many sources and types of data.

SUMMARY OF THE INVENTION

According to the invention, there is provided a process data management system comprising a machine interface for receiving process data of a process operation, and a processor for processing the data, wherein,
  the system comprises a plurality of modules, each module comprising a data collector component for capturing process source data, and a data logger component for saving data whereby each module is capable of operating independently to capture process source data, to process the source data to provide processed data, and to save the processed data,
  the data logger component saves the processed data in a format for storage in a universal storage structure used by all of the modules of the system, and
  each module comprises a messaging service for communication of data between modules.

In one embodiment, the universal structure comprises a hierarchy of process activities containing sub-activities, and leaf node activities containing event nodes for storing data.

In another embodiment, the top level of the hierarchy is an overall production process, and activity nodes represent specific process activities forming part of the production process.

In a further embodiment, at least some modules comprise a data processor component for receiving source data from the data collector component and for generating processed data for output and for logging by the data logger component.

In one embodiment, at least some data processors transmit processed data to the data logger component of a different module of the system or receive data from the data collector of a different module of the system.

In another embodiment, at least some data collector components translate source data to provide data in the universal structure.

In a further embodiment, the data collector component initially parses source data to provide the data in a mark-up language format, and translates the mark-up language to provide the universal structure format.

In one embodiment, the data logger component saves both source data and processed data and links each item of processed data to the source data from which it is derived.

In another embodiment, the links are activity source event records within the structure.

In a further embodiment, at least some modules contain a graphical data object server for transmitting a display program to a user for display of processed data outputted by a data processor.

In one embodiment, each graphical data object server transmits a program in response to a user browser accessing an internet or intranet address.

In another embodiment, the address is an Internet URL.

In a further embodiment, the program is executable code which uses parameters hosted on the module of the graphical data object server.

In one embodiment, a plurality of different graphical data object servers download programs for data output with different output formats.

In another embodiment, each module downloads a plurality of URLs for user to select from.

In a further embodiment, the server downloads multiple instances of a particular display program to a plurality of requesting users.

In one embodiment, there is only one parameter set per program per graphical data object server.

In another embodiment, each module comprises a management interface for configuring its module to comprise a desired configuration of components and the messaging service by adding, deleting, or modifying components and configuring the messaging service.

In a further embodiment, the management interface monitors the state and activities of the components and the messaging service.

In one embodiment, the components and the messaging service are objects which are objects which are instantiated by the management interface.

In another embodiment, the management interface operates to activate the module, to dynamically re-configure the module, and to shut down the module.

In a further embodiment, the data logger, the data collector, and the data processor components communicate data to each other using a push mechanism in which a receiving component is a subscriber.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which.

DESCRIPTION OF THE EMBODIMENTS

Figure 1:
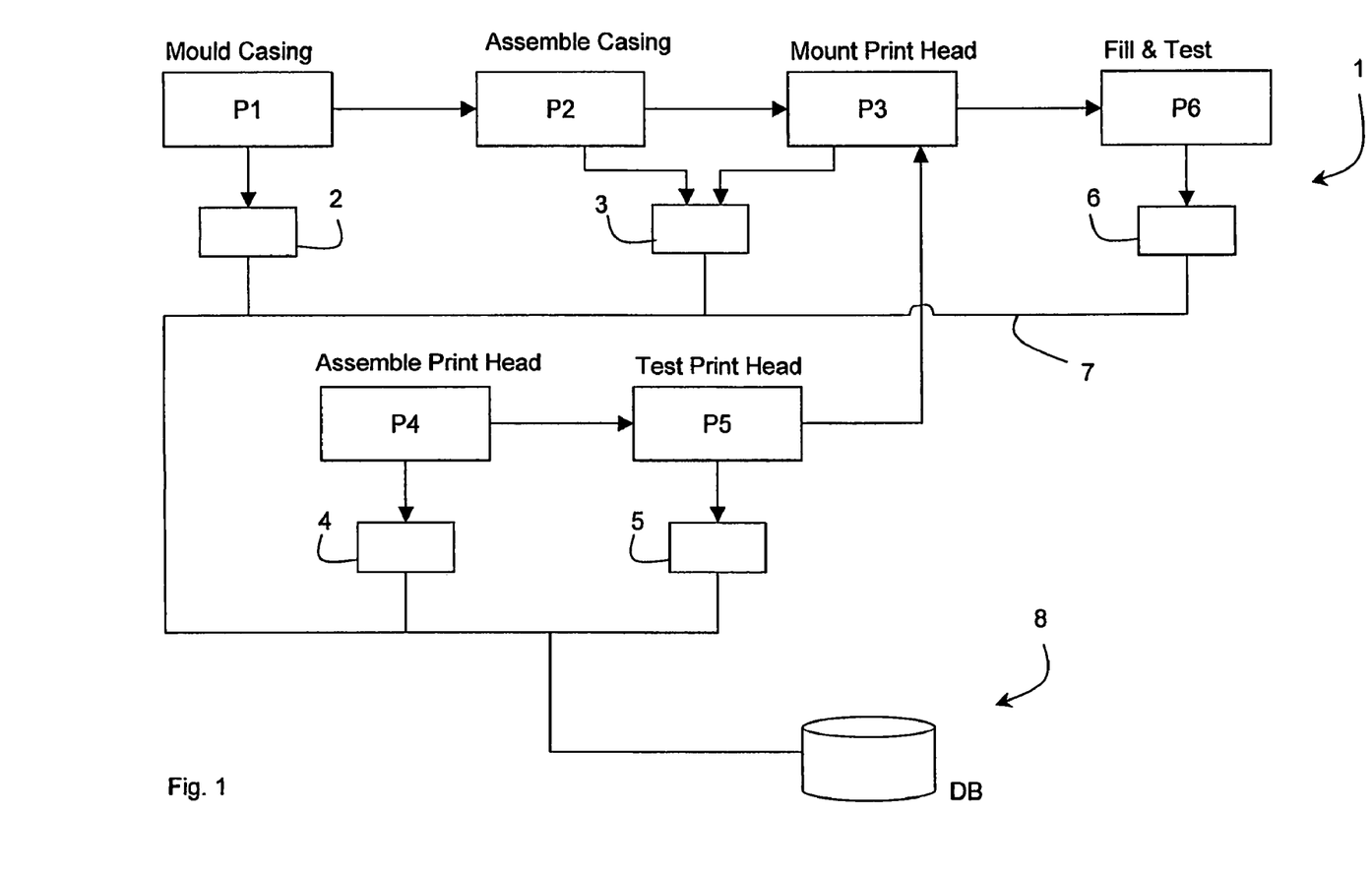
FIG. 1 is a high level diagram showing a process data management system of the invention in operation with production machines.

Referring to FIG. 1 a production process for manufacturing printer cartridges has the following steps:
p1: mould the cartridge casing,
P2: assemble casing,
P3: mount print head,
P4: assemble print head,
P5: test the print head, and
P6: fill and test the complete cartridge.

This is merely an example of a manufacturing line, and a process data management system of the invention may interface with a wide variety of production processes. A process data management system 1 comprises modules 2, 3, 4, 5, and 6, linked with the production machines P1, P2 and P3, P4, P5, and P6 respectively.

The modules 2–6 are autonomous, meaning that they can operate independently of the other modules. However, they communicate with each other in normal operation via a network 7 as described in more detail below. There is an overall system database 8, however this is omitted in other embodiments in favour of distributed storage at each module only.

Each module is capable of operating independently to perform data capture, data processing, data recording to storage, and user process data viewing. Part of the processing in each module is to convert the data into a format for capture with a universal data storage structure by all of the modules. This is achieved despite the fact that a wide variety of different types of data is captured such as numbers of units, queue times at buffer stations, and voltage signals representing test parameters. Also, each module can be easily configured to suit the particular production machine or machines by an engineer without specialist knowledge or programming ability.

Figure 2:
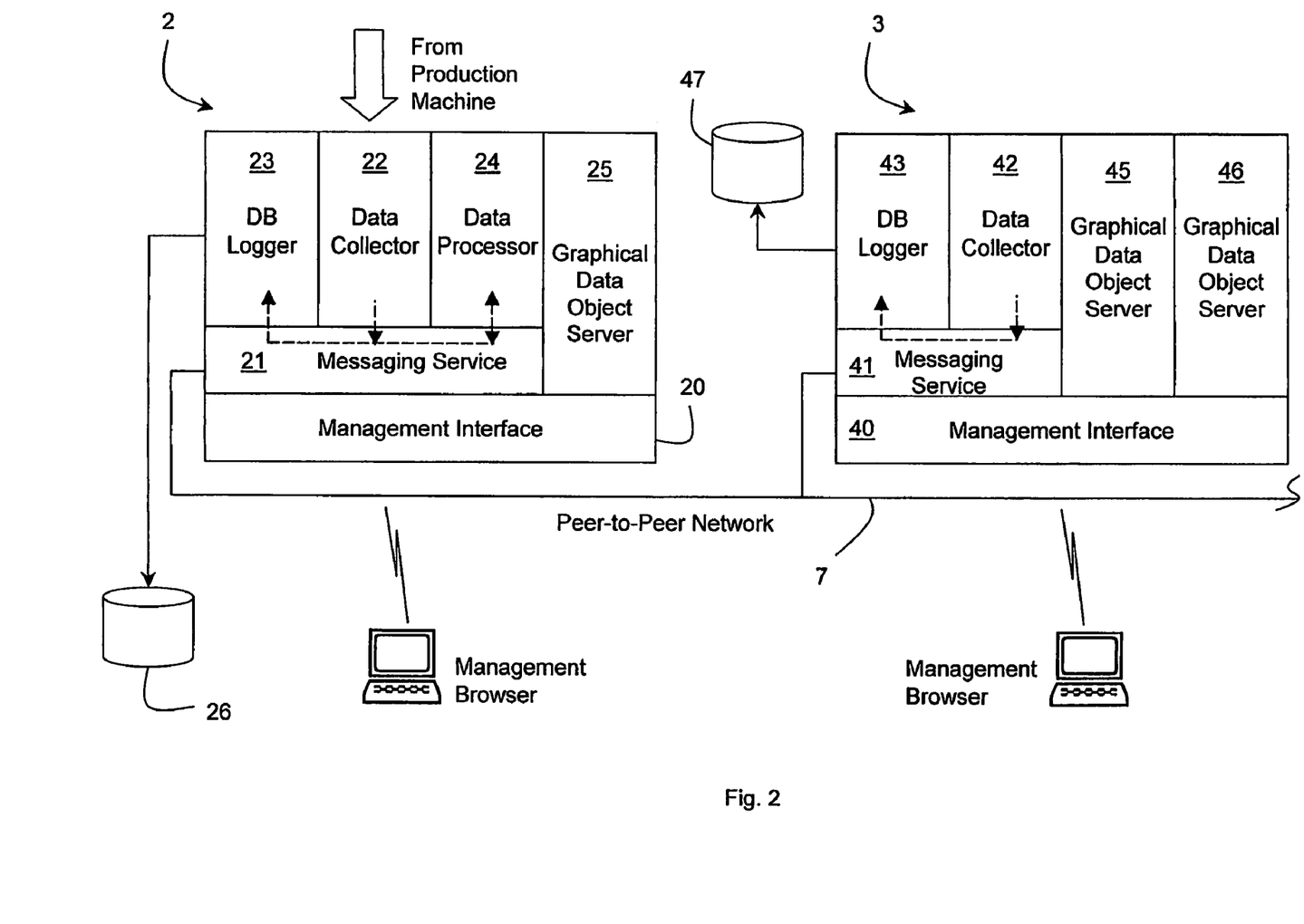
FIG. 2 is a more detailed block diagram of two modules of the system.

Referring to FIG. 2 the modules 2 and 3 are shown in more detail. The module 2 comprises a management interface 20 and a messaging service 21. A number of applications reside on the messaging service 21:

22: a data collector linked with the production machine and for routing raw data to other applications via the messaging service 21;

23: a data logger for routing raw data to a local module database 26; and     24: a data processor for receiving raw data and processing it to provide an output for user viewing and for saving processed data to the database 26.

Figure 2A:
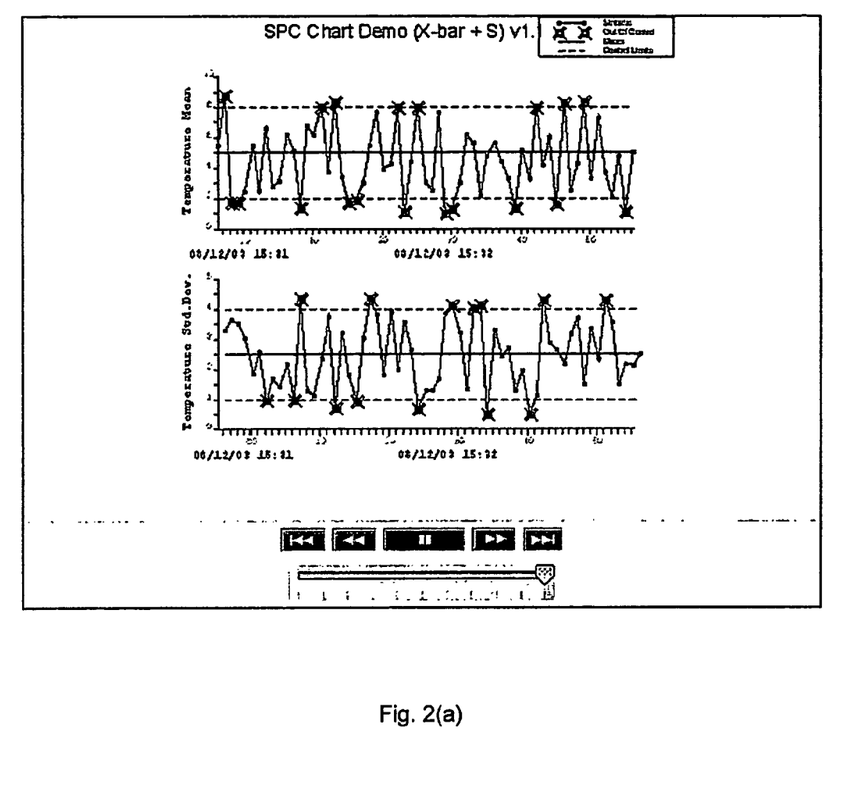
FIG. 2(a) is a sample output chart.

The module 2 also comprises a graphical data object (GDO) server 25. The function of the GDO server 25 is to download a program applet to a user browser in response to the user selecting a particular URL. This applet then establishes a session with the data processor 24 to dynamically generate a graphical output of processes data. A sample graphical output is shown in FIG. 2(a).

Regarding terminology, each module has a management interface and a messaging service. It also has components, including applications (for example data logger, data collector, and data processor) which communicate with each other, and GDO servers.

There can be many instances of a particular applet downloaded by the server 25, one per user browser URL request. Also, several different applets may establish sessions with the same data processor, one for each of a number of output formats such as line chart or bar chart. Each applet has a unique URL, an access to which causes the server 25 to automatically download an instance. The Web pages for the system present the available URLs in a clear menu, providing information about each output format. The applet instances which are downloaded are executable code, this code referring back to a parameter set stored by the relevant GDO server. This parameter set can be easily modified by a supervisor via the management interface 20. Each GDO server has one set of parameters. Thus where different sets of parameters exist for the same type of chart (applet) there must be multiple servers. Also URL's from several modules may appear on the same page of the user's browser.

The management interface 20 allows the supervisor to modify the configuration of the module, namely the applications, the messaging service, and GDO servers including the applet parameter set. It also launches the set of applications according to a framework to configure a fresh module. It also allows viewing of status of a module including its log history.

FIG. 2 also shows the module 3. This module comprises a management interface 40, a messaging service 41, a data collector 42, a data logger 43, two GDO servers 45 and 46, and a database 47. As is clear from this diagram, the messaging service 41 performs both internal communication within the module, and also inter-module communication on the network 7. The messaging technology used consists of XML messages which are sent from a sender application to a receiver or set of receiver applications. One-to-many Publish and Subscribe and one-to-one Send and Receive relationships are possible. These relationships are established in an applications' configuration by naming the other party to the relationship. No other configuration is required and it is not apparent to the application whether the other application is on its local module or a remote module accessed over the network.

The differences between the modules illustrate the point that each module, while conforming to the framework, is individual and can be different to suit the machine or machines it interfaces with and the process management functions required of it.

Figure 3:
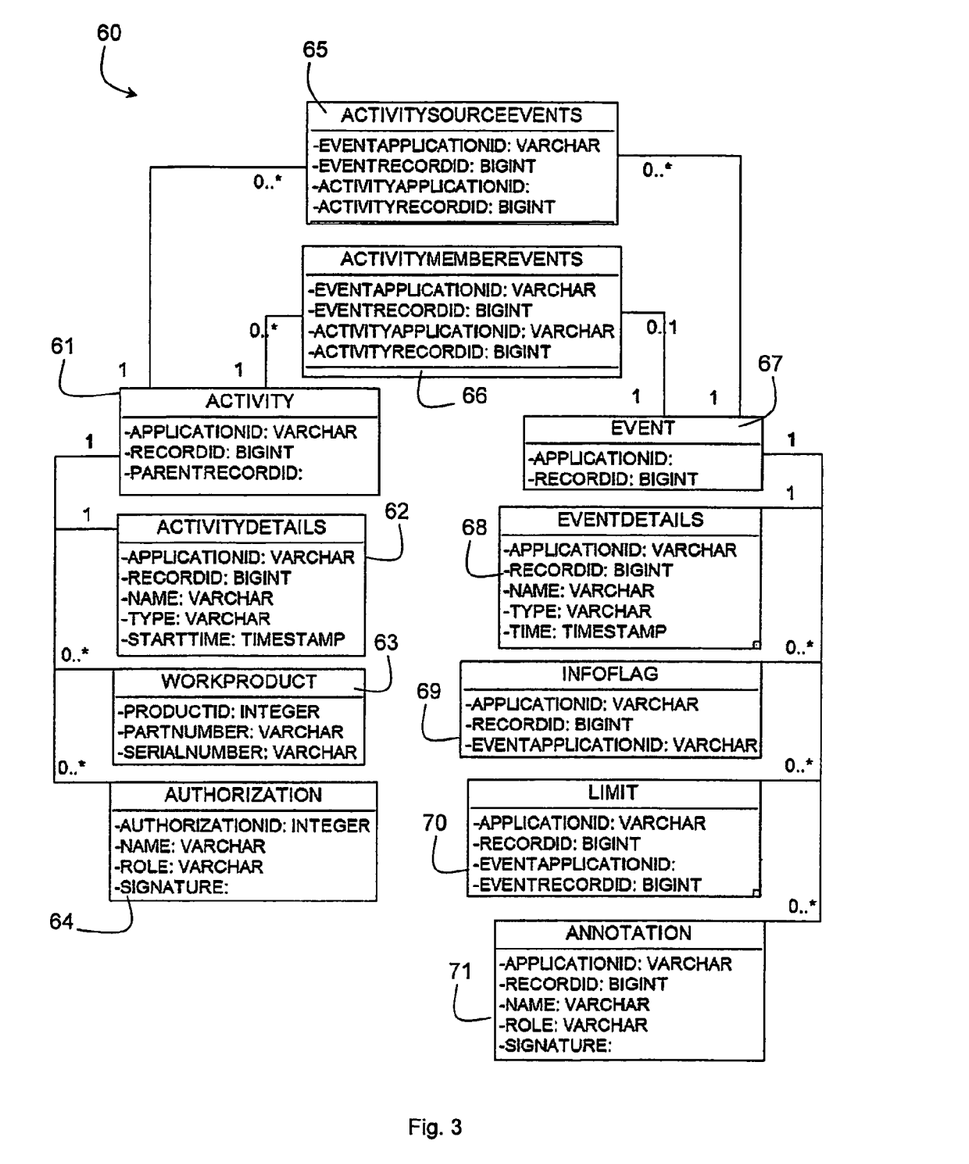
FIG. 3 is a diagram of the data structure for capture of process data.

Referring to FIG. 3, a class diagram for universal data structure 60 for use by all of the modules is shown. The structure comprises at it top an Activity 61 such as "manufacture printer cartridge". This is linked with multiple activities such as those of P1–P6. Each such activity has a sub-structure 62 for activity details, a sub-structure 63 for work product data, and a sub-structure 64 for authorisation. Also, nodes at the lower level of the hierarchy comprise events of which there are two types: activity source events 65 and activity member events 66. Activity member events are data items, such as voltage signals from a temperature measurement instrument, a frequency signal from a UHF device, or a string of text from a computer under test, which are produced by the parent activity. Activity source events are data items originating from another activity which were used to generate this activity record, for instance by the action of a processor. Each event comprises:

event details 68,
information flag 69,
limit 70, and
annotation 71.

The events are the actual process data, saved in conformity with the structure of 68–71. FIG. 3 is a general class diagram. The data logger saves both the raw data and the processed data in this structure. The processed data is linked to the source raw data by the activity source event 65 references.

In any one system, data objects are instantiated so that there is a hierarchy of objects with the overall activity (e.g. "manufacture ink cartridges") at the top, zero or more levels of child activities nested under parent activities, and leaf event objects. The process data is stored in the event objects. Thus, there is one structure, which is capable of representing any technical process, and each system organises this structure in the way which best represents its process data.

Figure 4:
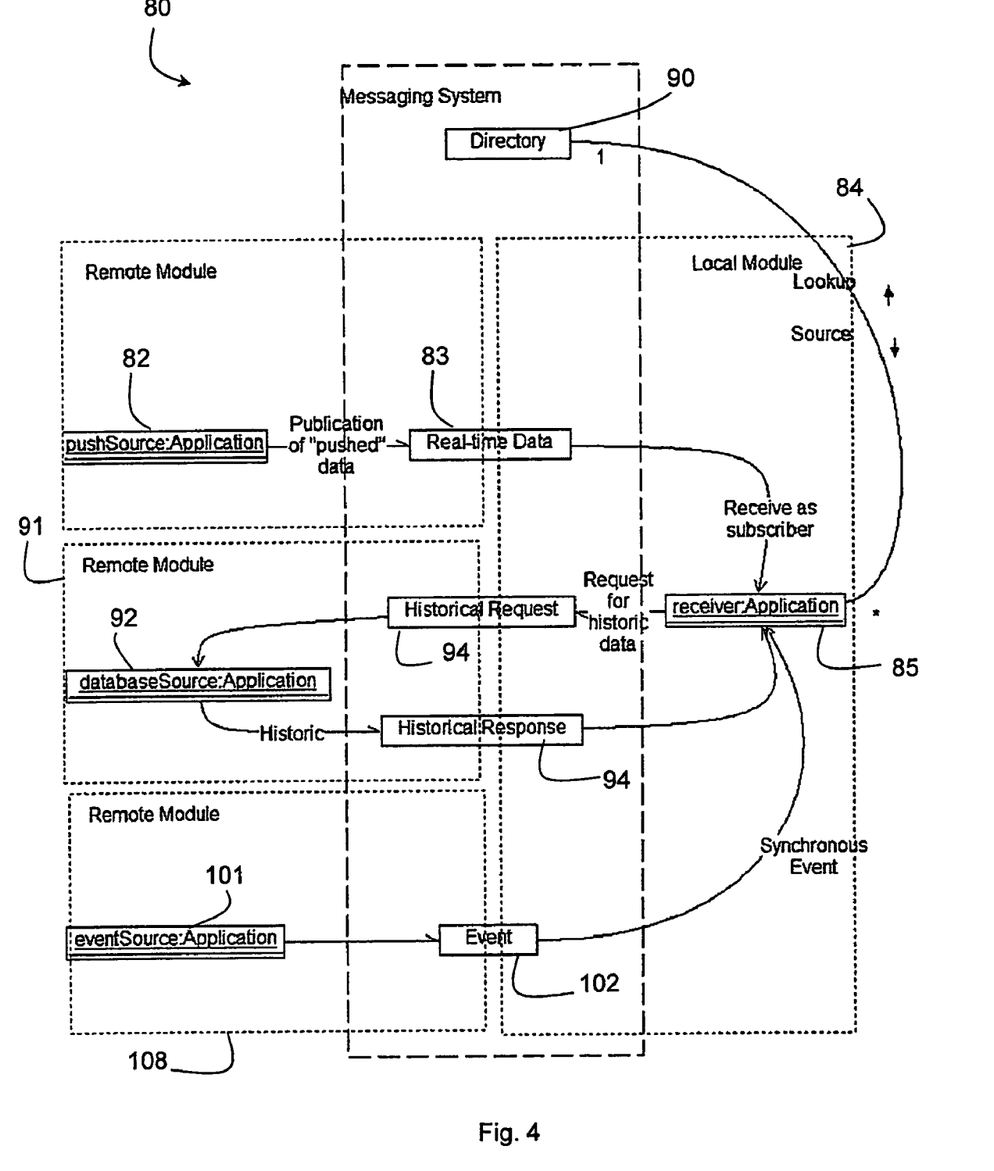
FIG. 4 is a model illustrating communication between components of different modules of the system.

Referring to FIG. 4 a model 80 for communication between components both within and between modules is shown. A remote module 81 has a data collector 82 which publishes data for a push service via a queue 83 in the messaging service of its module. A local module 84 has a data processor 85 which receives raw data as a subscriber via the messaging services of the local and remote modules and the network 7. The processor 85 automatically routes data via a queue 93 of the messaging service of its module to a data logger 92 of a different remote module 91. The data logger 92 also satisfies requests for historical data via a queue 94 in its module. This diagram also shows routing of processed data from a data processor 101 of another remote module 100 to the data processor 85 via a queue 102 of the remote module. This diagram illustrates the versatility of the architecture, whereby data is routed between applications within or between modules. Raw data can be routed to data processors either local or remote, and indeed processed data can be routed from one data processor to another data processor or data logger either local or remote. The push subscriber service has been found to be particularly effective. Other advantages are that communication can be set up simply in an application's configuration by entering the name of the other component. Also, an application does not know whether the other application it is communicating with is on its local or a remote module. Further, all infrastructure for the messaging service is set up by the module(s) without requiring intervention or technical knowledge by the supervisor.

Figure 5:
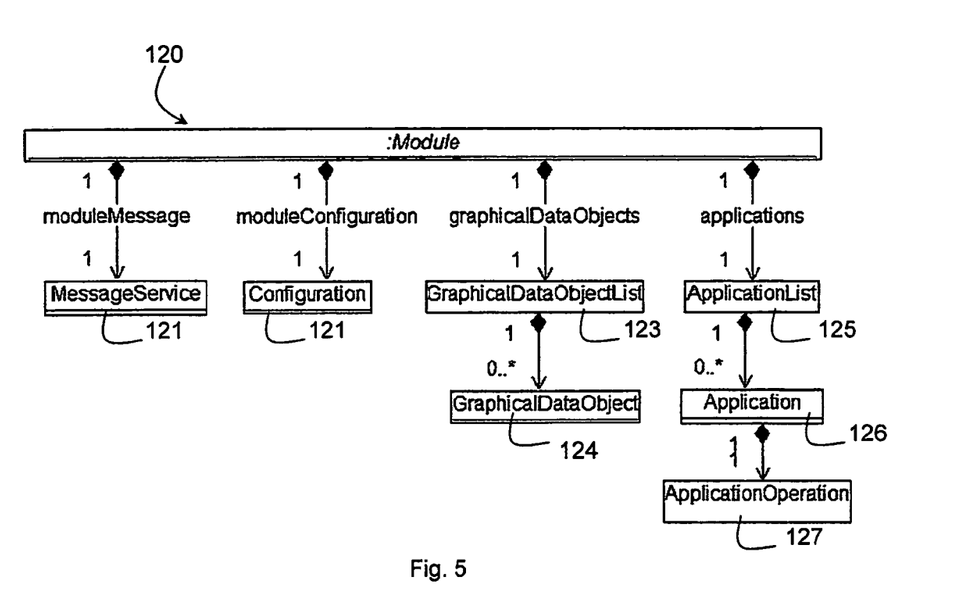
FIG. 5 is a pair of object relationship diagrams illustrating configurations of modules.

Referring to FIG. 5 an object relationship diagram is shown. A module 120 contains a message service 121, a configuration 122, a GDO object list 123 containing GDO servers 124, and an application list 125 containing applications 126, in turn containing a specific operation 127 to perform. Thus, the components 22, 23, and 24 of the module 2 are all applications configured according to a configuration object 122 and residing on a messaging service object 121. Likewise, the GDO servers are also components. This diagram illustrates modularity within each individual module. The management interface 20 or 40 instantiating or modifying components as objects in the object-oriented paradigm.

Figure 6:
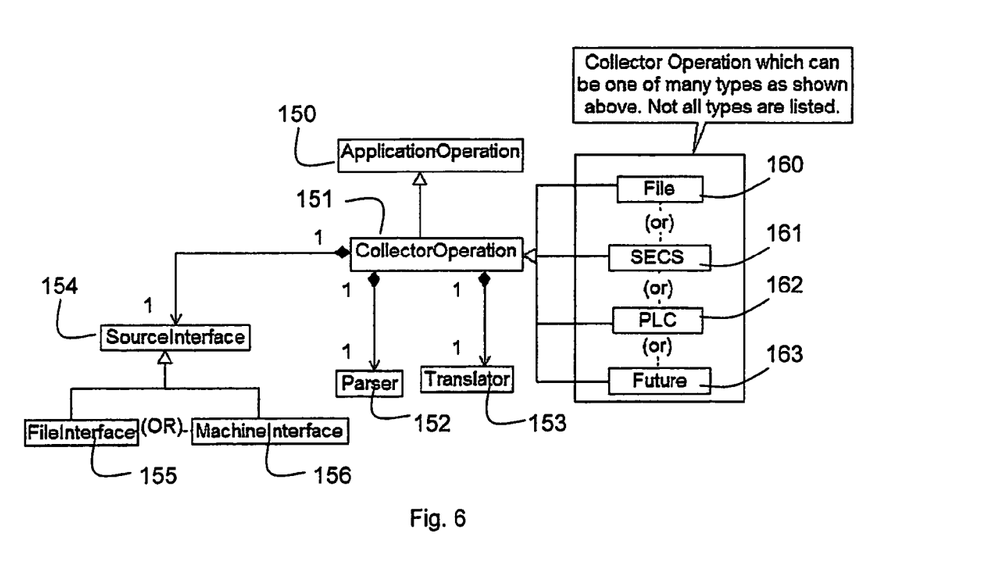
FIG. 6 is a flow diagram showing operation of components of a module.

Referring to FIG. 6 the structure of a data collector is illustrated. A data collector operation represented as 151 is a type of application operation and has in turn parser 152 and translation 153 objects. The data collector receives data from a source interface 154. There are many different types of source interface which may be plugged into the same data collector structure. This allows for a variety of data collector applications 160 (from file), 161 (from electronics manufacturing equipment), 162 (from a PLC), and 163 (from a future collector). The parser operation 152 parses the raw data from the collectors and generates XML. The translation operation 153 processes the XML to provide the data in the activity-event structure as illustrated in FIG. 3. This involves the translator operation progressing through activity nodes of the tree to reach the event objects for storage of the data. Each translation operation of each data collector of each module uses this structure so that the data is available in one universal structure.

Figure 7:
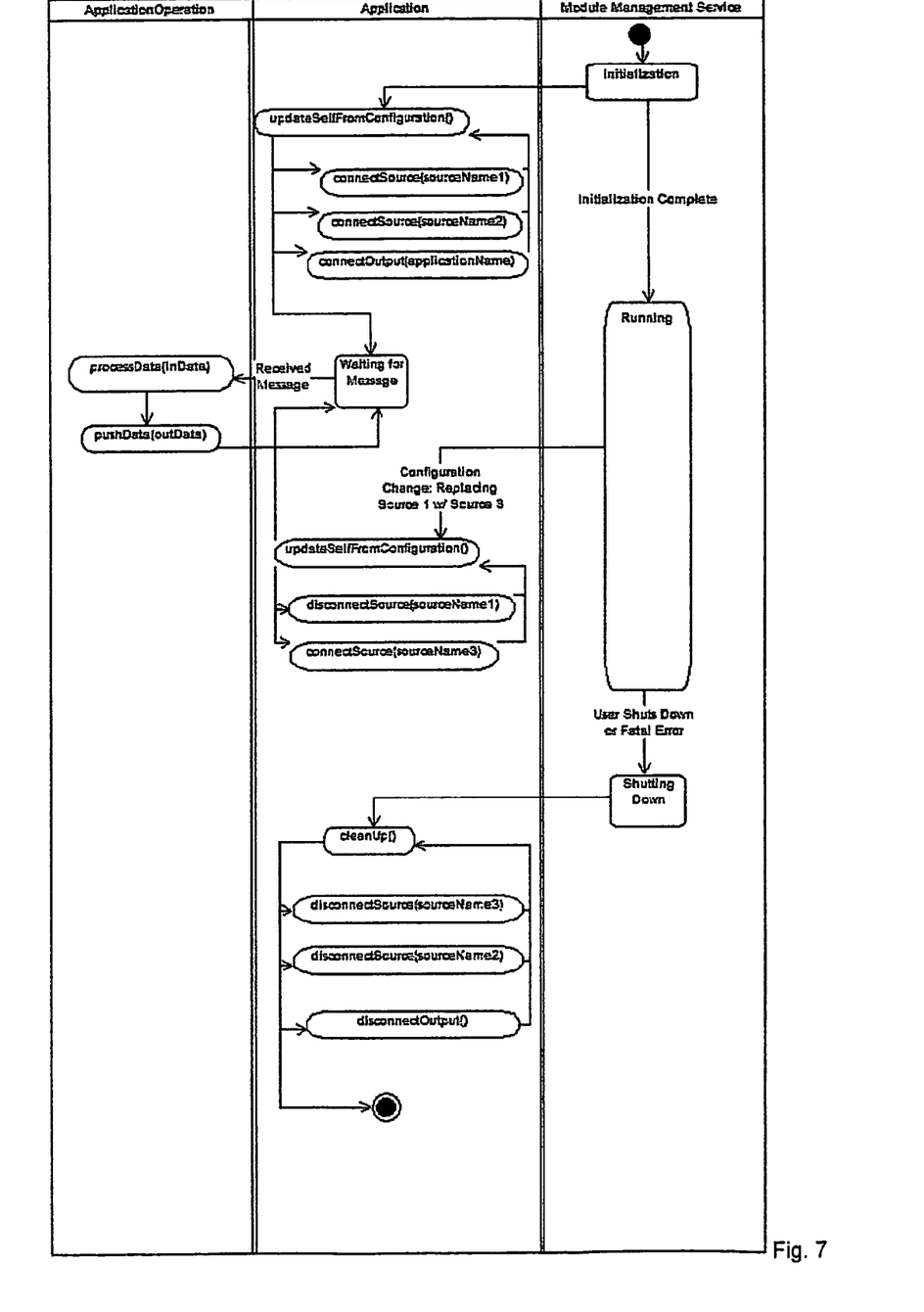
FIGS. 7 and 8 are signal transfer diagrams showing communication between components in more detail.
Figure 8:
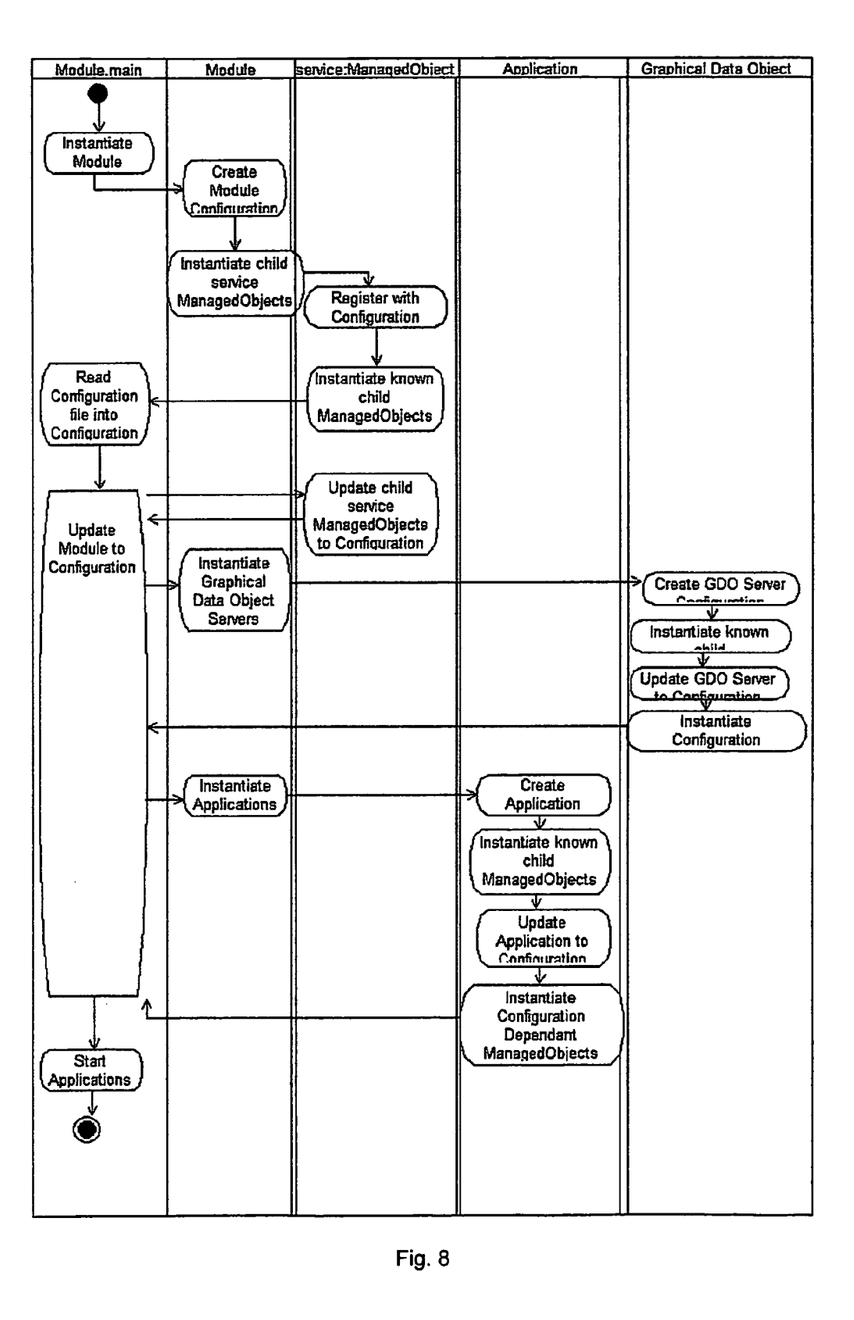

FIGS. 7 and 8 show signal transfers between components. FIG. 7 in particular shows that there can be a configuration change at any time as initiated by the management service. Upon initialisation, an application makes its output available on the messaging service and connects to its source applications, and upon receipt of a configuration change notification from the management service it updates its configuration, disconnects the sources and output, and makes new connections. Finally, a user request to shut down causes the management service to transmit a shut-down instruction to the component, causing it to disconnect.

FIG. 8 shows instantiation of a module by creating a configuration and registering parent and child objects with the management service. This diagram shows instantiation of GDO server instances.

It will be appreciated that the invention provides a system for collection and processing of process data with excellent versatility so that it can be easily configured for use with different processes. It is also possible to scale the system from a small scale perhaps collecting data from a single source and logging it to a database, to a very large scale system spanning a whole factory collecting data from hundreds of sources and performing many operations upon it. This is achieved by adding further components to existing modules or deploying new modules on additional computers as the workload requires. Also, there is excellent reliability as the modules are autonomous from data capture to storage, and there is no single point of failure in the system as a whole. Reliability is further enhanced by configuring application components as sources and outputs in a scheme providing redundancy as desired. Another major advantage is that the modules can be easily configured to provide data to a variety of users in a flexible manner in which the users only need to operate their browsers to select an appropriate URL.

The invention is not limited to the embodiments described, but may be varied in construction and detail.

The invention claimed is:

1. A process data management system comprising a machine interface for receiving process data of a process operation, and a processor for processing the data, wherein,
 the system comprises a plurality of modules, each module comprising a data collector component for capturing process source data, and a data logger component for saving data whereby each module is capable of operating independently to capture process source data, to process the source data to provide processed data, and to save the processed data;
 the data logger component saves the processed data in a format for storage in a universal storage structure used by all of the modules of the system;
 the universal storage structure comprises a hierarchy of process activities containing sub-activities, and leaf node activities containing event nodes for storing data;
 the top level of the hierarchy is an overall production process, and activity nodes represent specific process activities forming part of the production process;
 the data logger component saves both source data and processed data and links each item of processed data to the source data from which it is derived;
 each module comprises a messaging service for communication of data between modules;
 at least some modules comprise a data processor component for receiving source data from the data collector component and for generating processed data for output and for logging by the data logger component; and
 at least some data processor components transmit via the messaging service processed data to the data logger component or the data processor component of a different module of the system or receive data via the messaging service data from the data collector of a different module of the system.

2. The system as claimed in claims 1, wherein at least some data collector components translate source data to provide data in the universal storage structure.

3. The system as claimed in claim 2, wherein the data collector component initially parses source data to provide the data in a mark-up language format, and translates the mark-up language to provide the universal storage structure format.

4. The system as claimed in claim 1, wherein the links between source data and processed data are activity source event records within the universal storage structure.

5. The system as claimed in claim 1, wherein at least some modules contain a graphical data object server for transmitting a display program to a user for display of processed data outputted by a data processor.

6. The system as claimed in claim 1, wherein at least some modules contain a graphical data object server for transmitting a display program to a user for display of processed data outputted by a data processor; and wherein each graphical data object server transmits a program in response to a user browser accessing an internet or intranet address.

7. The system as claimed in claim 1, wherein at least some modules contain a graphical data object server for transmitting a display program to a user for display of processed data outputted by the data processor component; and wherein each graphical data object server transmits a program in response to a user browser accessing an internet or intranet address; and wherein the address is an Internet URL.

8. The system as claimed in claim 1, wherein at least some modules contain a graphical data object server for transmitting a display program to a user for display of processed data outputted by the data processor component; and wherein the program is executable code which uses parameters hosted on the module of the graphical data object server.

9. The system as claimed in claim 1, wherein at least some modules contain a graphical data object server for transmitting a display program to a user for display of processed data outputted by the data processor component; and wherein a plurality of different graphical data object servers download programs for data output with different output formats.

10. The system as claimed in claim 1, wherein at least some modules contain a graphical data object server for transmitting a display program to a user for display of processed data outputted by the data processor component; and wherein the program is executable code which uses parameters hosted on the module of the graphical data object server; and wherein each module downloads a plurality of URLs for user to select from.

11. The system as claimed in claim 1, wherein at least some modules contain a graphical data object server for transmitting a display program to a user for display of processed data outputted by the data processor component; and wherein the server downloads multiple instances of a particular display program to a plurality of requesting users.

12. The system as claimed in claim 1, wherein at least some modules contain a graphical data object server for transmitting a display program to a user for display of processed data outputted by the data processor component; and wherein the program is executable code which uses parameters hosted on the module of the graphical data object server; and wherein there is only one parameter set per program per graphical data object server.

13. The system as claimed in claim 1, wherein each module comprises a management interface for configuring its module to comprise a desired configuration of components and the messaging service by adding, deleting, or modifying components and configuring the messaging service.

14. The system as claimed in claim 1, wherein each module comprises a management interface for configuring its module to comprise a desired configuration of components and the messaging service by adding, deleting, or modifying components and configuring the messaging service; and wherein the management interface monitors the state and activities of the components and the messaging service.

15. The system as claimed in claim 1, wherein each module comprises a management interface for configuring its module to comprise a desired configuration of components and the messaging service by adding, deleting, or modifying components and configuring the messaging service; and wherein the components and the messaging service are objects which are objects which are instantiated by the management interface.

16. The system as claimed in claim 1, wherein each module comprises a management interface for configuring its module to comprise a desired configuration of components and the messaging service by adding, deleting, or modifying components and configuring the messaging service; and wherein the management interface operates to activate the module, to dynamically re-configure the module, and to shut down the module.

17. The system as claimed in claim 1, wherein the data logger, the data collector, and the data processor components communicate data to each other using a push mechanism in which a receiving component is a subscriber.

18. A process data management method carried out by a system comprising a plurality of modules, each module comprising a data collector component for capturing process source data from a machine implementing a production process, and a data logger component for saving data whereby each module is capable of operating independently to capture process source data, to process the source data to provide processed data, and to save the processed data, wherein each module comprises a messaging service for communication of data between modules, wherein at least some modules comprise a data processor component for receiving source data from the data collector component and for generating processed data for output and for logging by the data logger component, and wherein the method comprises the steps of:

the data logger component of each module saving the processed data in a format for storage in a universal storage structure used by all of the modules of the system, wherein the universal storage structure comprises a hierarchy of process activities containing sub-activities, and leaf node activities containing event nodes for storing data, and wherein the top level of the hierarchy is the overall production process, and activity nodes represent specific process activities forming part of the production process:

the data logger component saving both source data and processed data and linking each item of processed data to the source data from which it is derived: and at least some data processors transmitting via the messaging service processed data to the data logger component or the data processor component of a different module of the system, or receive via the messaging service data from the data collector of a different module of the system.

19. A computer program product comprising software code for performing operations of a method of claim 18 when executing on a digital computer.

* * * * *